No. 635,881. Patented Oct. 31, 1899.
E. THOMSON.
ELECTRIC METER.
(Application filed Sept. 2, 1898.)
(No Model.) 2 Sheets—Sheet 1.

WITNESSES.
Edw. Williams
Dugald McKillop

INVENTOR.
Elihu Thomson,
by Albert G. Davis
Atty.

No. 635,881. Patented Oct. 31, 1899.
E. THOMSON.
ELECTRIC METER.
(Application filed Sept. 2, 1898.)
(No Model.) 2 Sheets—Sheet 2.
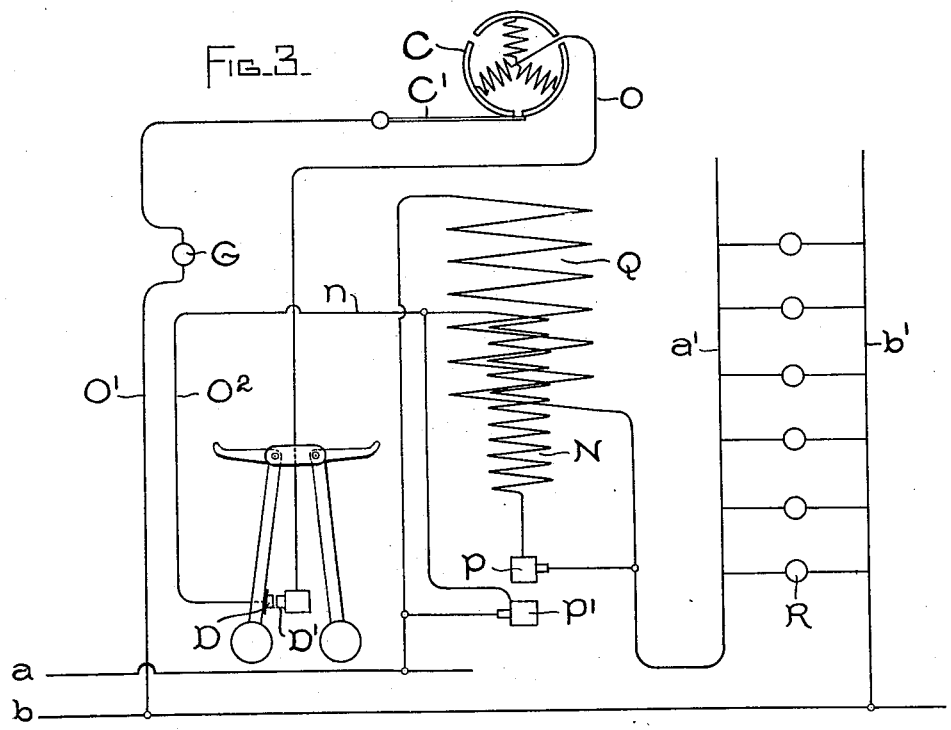
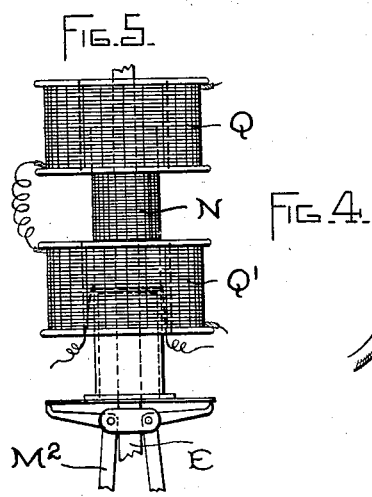
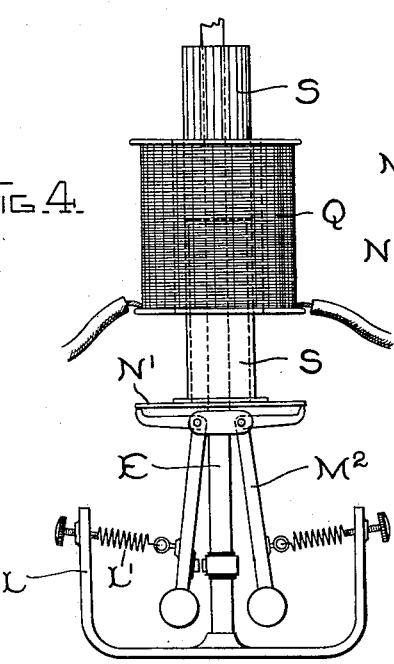
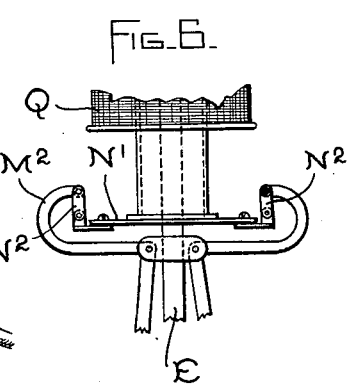
WITNESSES.
E. Williams
Dugald McKillop
INVENTOR.
Elihu Thomson,
by Albert G. Davis
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRIC METER.

SPECIFICATION forming part of Letters Patent No. 635,881, dated October 31, 1899.

Application filed September 2, 1898. Serial No. 690,100. (No model.)

*To all whom it may concern:*

Be it known that I, ELIHU THOMSON, a citizen of the United States, residing at Swampscott, in the county of Essex and State of Massachusetts, have invented certain new and useful Improvements in Electric Meters, (Case No. 735,) of which the following is a specification.

My invention relates to electric meters, and more particularly to current-recording meters, and has for one of its objects to provide a meter which will record the current consumption in an electric circuit.

The invention also relates to certain details of construction more fully pointed out in the claims.

Figure 1:
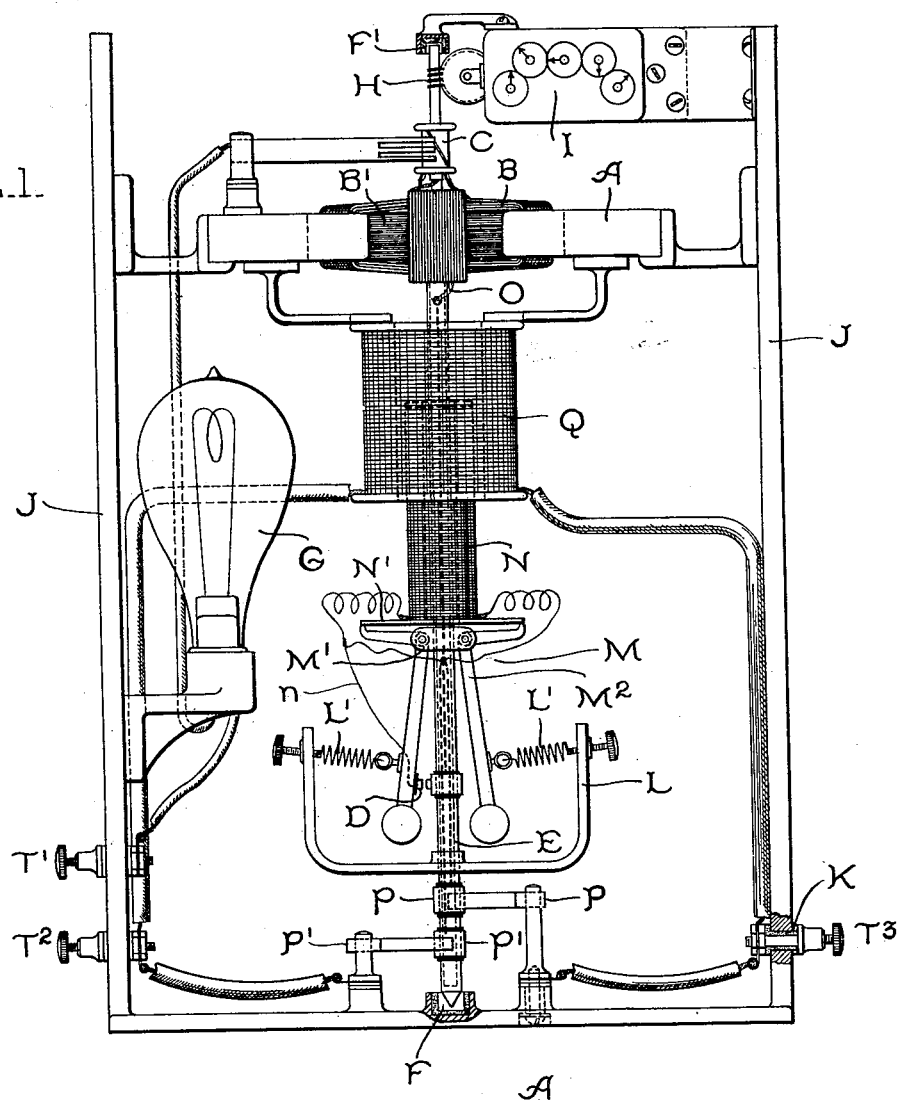
Figure 2:
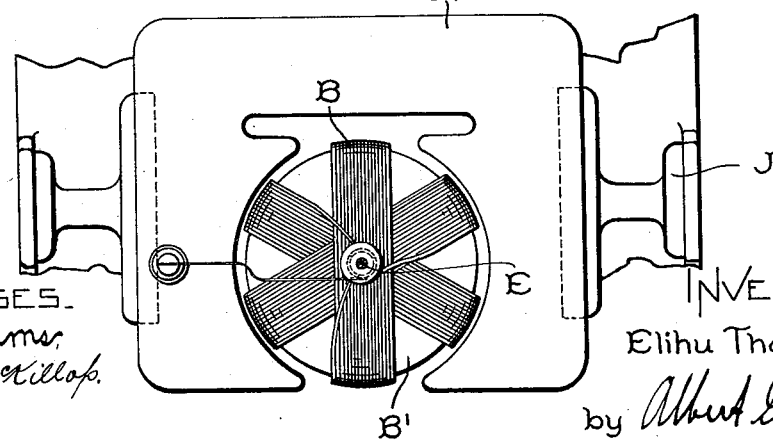

In the accompanying drawings, which show an embodiment of my invention, Figure 1 is a front elevation of a meter. Fig. 2 is a plan view of the motor mechanism. Fig. 3 is a diagram of the circuit connections, and Figs. 4, 5, and 6 are slight modifications.

In carrying out my invention I utilize the following well-known principles: first, that the development of centrifugal force varies as the square of the angular velocity of the rotating body, and, second, that the repulsion or attraction of a current-carrying coil which is within the influence of another current-carrying coil will vary as the products of the currents flowing in the coils or as the square of the total current when such coils are in series or in parallel to each other.

Mounted in any suitable manner on the frame of the meter is a small electric motor having a stationary field-magnet A and an armature B, arranged to revolve between the poles of the field-magnet. The field-magnet may be an electromagnet or may be a permanent magnet made up of a set of steel punchings or a piece of magnetized steel or iron, as desired. The armature is shown as being provided with three coils, which are provided with a common joint at their inner ends and at their outer ends are connected to a commutator C, having three insulated commutator-segments. This arrangement dispenses with the use of one commutator-brush and simplifies the construction of the meter; but any other arrangement of coils may be substituted, if desired. The armature of the motor when the circuit is completed is connected across the mains $a$ and $b$ and is practically capable of increasing its speed to any limit within the capacity of the meter. This acceleration, however, is checked by the opening of the controlling switch or contact D, which will be described hereinafter. The wire of which the armature-coils are composed is comparatively fine, so as to save current, while that of the load-coils Q is relatively coarse, depending upon the maximum load to be carried. Connection between the exterior circuit and the meter is established through the binding-posts $T'$, $T^2$, and $T^3$, each post being insulated from the meter-casing J by a suitable bushing K.

The armature of the motor is shown as being provided with a laminated core $B'$; but this is not essential, the only requisite being that the motor shall have sufficient torque at all speeds to overcome the friction of the moving parts without material retardation, and particularly when revolving at the highest speeds. If this is observed, the friction of the pivots and that of the moving contact-rings will not affect the reading of the meter.

Supported on a bracket located at one side of the meter is an incandescent lamp G, having a high-resistance filament which is in circuit with the armature B. The size and resistance of the filament are such that it is not sensibly heated by the small current passing through the motor.

The armature-shaft E is made hollow for the larger portion of its length and is supported at the bottom by a jewel-bearing F and at the top by a parallel bearing $F'$. On the upper end of the shaft is a worm H, which meshes with a worm-wheel on the registering mechanism I. Rigidly secured to the lower end of the armature-shaft is a U-shaped frame L, and between the arms of this frame and the arms of the centrifugal governor M are adjustable tension-springs $L'$. The centrifugal governor is secured at its upper end to the armature-shaft, and supported by the collar $M'$, which encircles the shaft, is a pair of inverted-L-shaped weighted arms $M^2$, one of said arms carrying the moving contact D.

Situated above the governor and supported thereby is an electromagnet N, which is composed of a number of turns of wire wound on a suitable spool and is permanently connected in multiple with the load-coil Q. The spool upon which coil N is wound is free to move up and down on the armature-shaft as the repulsion effect between the coils Q and N varies. The lower end of the spool is provided with a disk N', which rests on the outer ends of the arms $M^2$, and the weight of the wire and disk at all times tends to close the contact D; but this tendency is opposed to a greater or less extent by the centrifugal action of the moving parts and also by the springs L'.

Mounted on the shaft opposite the moving contact D is a fixed contact D', which is connected by a wire O with the junction of the three armature-coils. Situated below the frame L are two contact-rings P and P', which are insulated from each other and from the armature-shaft. The ring P is connected with one end of the coil N and the ring P' with the other end, the wires for connecting the coil and contacts being situated within the hollow portion of the armature-shaft. In addition the coil N is connected at one end to the moving contact D on the governor-arm by wire $n$.

Mounted on suitable studs for engagement with the rings P and P' are brushes $p$ and $p'$, brush $p$ being connected to binding-post $T^3$ and brush $p'$ to binding-post $T^2$.

Mounted on brackets secured to the under side of the field-magnet A is a stationary load-coil Q, which surrounds the moving coil N and tends when current is flowing therein to repel the moving coil. This stationary coil is connected in series with one of the circuit-mains, and a portion of the current for the translating devices passes through it. If desired, the current passing in this coil may be adjusted by shunting the coil with a resistance. The two coils Q and N are connected in multiple with each other, so that both are affected by changes of current in the load-circuit. These coils may bear any desired relation to each other. For example, coil Q may carry twice the current that coil N carries, or the relation may be reversed.

It is within the scope of the invention to reverse the relation of the coils N and Q—that is to say, arrange them in such manner that when current flows therein they will tend to attract each other instead of repel. It is desirable, however, to utilize the repulsion of the coils instead of the attraction, as it simplifies the construction of the meter.

The circuit connections are clearly shown in Fig. 3, in which $a$ and $b$ represent the mains of a system of distribution, and $a'$ and $b'$ the mains of the work-circuit. The load on the work-circuit is indicated by the lamps R; but the meter is adapted to register the consumption of energy when other forms of translating device are in circuit—as, for example, motors and storage batteries. The coils of the armature are connected to the main $b$ by the wire O' and the commutator-brush C', the lamp G acting as a resistance to reduce the current. A wire O is connected to the common connection between the armature-coils and extends to contact D' on the governor. The contact D, which completes the circuit of the armature, is carried by an arm of the governor and is connected to the main $a$ by the wire $O^2$. The stationary coil Q is connected in series with the mains $a$ $a'$ and is influenced by the current flowing in the system. The movable coil N is connected in series with the main $a$ and also in multiple arc to the coil Q.

For certain classes of work where great accuracy is not required I may substitute an iron core S, as shown in Fig. 4, for the coil N and mount it on the armature-shaft E in such manner that it is free to move up and down as the current in the coil Q changes. Instead of utilizing the repulsion of the coil Q, as before, the coil S is arranged to extend above the coil and be attracted thereby, the action of the governor, however, being the same as in the first instance.

In Fig. 5 is shown a further modification, in which the load-coil is divided into two parts Q and Q', and mounted within these coils is the coil N. The coils Q and Q' are so disposed with respect to the coil N that coil Q tends to repel it and coil Q' to attract it.

In Fig. 6 is shown a slight modification of the governor, in which the arms $M^2$ are connected to the disk N' of the potential coil by means of links $N^3$.

The meter described is suitable for use with continuous currents chiefly; but it may be adapted for use with alternating currents by modifying the armature of the motor in any of the well-known ways. If desired, it may be made an induction or repulsion motor, whose torque is such as to secure the range of speed required under the slight load carried. The load-coil Q will not require changing other than to split the spool upon which it is wound to prevent eddy-currents.

Variations from the particular design and relation of parts may be made without departing from the spirit of my invention.

The operation of my invention is as follows: At no load the contacts D and D' are separated and no current flows in the armature-coils. This is a particularly good feature, as it reduces the loss in the meter and prevents the creep which is common in certain types of meters. As soon as one or more translating devices are included in the work-circuit the repulsion between the load-coil Q and the coil N closes the armature-circuit at contacts D and D' and the armature commences to revolve. This causes the worm on the upper end of the armature-shaft to revolve and actuate the recording mechanism. As soon, however, as the speed of the armature increases to a point where the effort produced by centrifugal action of the governor is greater than the repulsion effort between the two load-coils the contacts D and D' will separate and the armature will run more slowly until the effect of the coils is sufficient to close the circuit again. This action continues during such time as the load is on the circuit. If the load doubles, the repulsion between the two load-coils is increased four times. This causes the motor to accelerate, and at double speed the centrifugal force of the governor increases four times. The contacts will now open and close intermittently, as before. This action changes the rate of revolution for every change of load and in proportion thereto.

While I have described my invention in connection with a current-meter, it is evident that certain of its features could be used in connection with a wattmeter.

What I claim as new, and desire to secure by Letters Patent of the United States, is—

1. The combination of a motive device, means controlled by centrifugal force for governing said motive device, and means for balancing said centrifugal force by the force exerted between relatively-movable coils in multiple with each other.

2. The combination of a motive device, means controlled by centrifugal force for governing said motive device, and means for balancing said centrifugal force by the force exerted between two relatively-rotatable coils in multiple with each other.

3. The combination of a motive device, means controlled by centrifugal force for governing said motive device, and means for balancing said centrifugal force by the force exerted between two coils continuously rotatable with respect to each other.

4. In an electric meter, the combination of a motor, a contact for making and breaking the circuit of the motor, a rotating and a stationary load-coil, and means controlled by the force exerted between the coils for actuating the contact.

5. In an electric meter, the combination of a motor, a current-coil which is connected in circuit in such manner that the current flowing therein is dependent upon the current flowing in the work-circuit, a second current-coil connected in multiple to the first, the two coils being in inductive relation to each other, and a centrifugal governor for opening the circuit of the motor.

6. In an electric meter, the combination of an armature mounted on a shaft, a field-magnet therefor, a stationary load-coil surrounding the armature-shaft and concentric therewith, a second load-coil mounted on the armature-shaft and within the influence of the first-named load-coil, and a centrifugal governor also carried by the armature-shaft.

7. In an electric meter, the combination of an armature mounted on a shaft, a field-magnet therefor, a stationary load-coil surrounding the armature-shaft, a second load-coil mounted on the armature-shaft and free to move up and down thereon as the induction between the coils varies, a centrifugal governor also mounted on the shaft, a contact controlled by the governor for opening and closing the circuit of the armature, and means for adjusting the relation of the contacts.

In witness whereof I have hereunto set my hand this 30th day of August, 1898.

ELIHU THOMSON.

Witnesses:
DUGALD MCKILLOP,
ROBERT SHAND.